Figure 1:
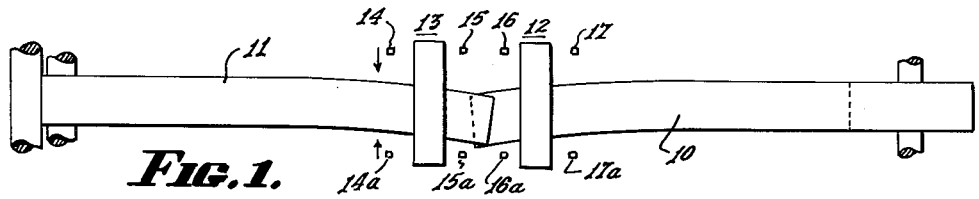

Oct. 9, 1962 M. J. FOLEY ET AL 3,057,056

METHOD OF ALIGNING AND WELDING COIL ENDS

Filed Dec. 24, 1957 3 Sheets-Sheet 1

INVENTORS.
MATTHEW J. FOLEY
AND ROBERT S. BURNS,
BY
ATTORNEYS.

INVENTORS.
MATTHEW J. FOLEY
AND ROBERT S. BURNS,
BY
ATTORNEYS.

United States Patent Office 3,057,056
Patented Oct. 9, 1962

3,057,056
METHOD OF ALIGNING AND WELDING COIL ENDS
Matthew J. Foley and Robert S. Burns, Middletown, Ohio, assignors to Armco Steel Corporation, Middletown, Ohio, a corporation of Ohio
Filed Dec. 24, 1957, Ser. No. 705,053
2 Claims. (Cl. 29—475)

This invention relates to a method and apparatus for aligning coil ends for welding, stitching or other joining. The invention is particularly applicable where the coils whose ends are to be welded together are characterized by camber. In rolling strip in a rolling mill, and particularly at the beginning and end of a given strip where tension and control are lost, the strip tends to be non-rectangular in cross-section or in other words to be thicker along one edge than the other. As a result of this, the strip will have a slight curve in its plane and it is this curvature which is known as camber.

In welding together two coils after they have been reduced by the hot mill and to prepare them for cold reduction, it is usual to join the leading end of one coil to the trailing end of another. However, when a slab is hot rolled, the trailing end cools down more and hence is harder to work, with the result that the trailing end of a coil is somewhat thicker than the leading end. It is not an uncommon practice to re-wind alternate coils, and weld them trailing end to trailing end and leading end to leading end, so as more nearly to match the thickness being welded together. In any event, there is always the danger that the so-called camber will be compounded in joining the ends of two strips together as a result of which an undue strain is placed on the weld and the strip is very apt to tear during further cold reduction.

We have determined that the ill effects of camber can be minimized by shearing the cambered ends of the strip substantially on a radius of curvature of the camber and also to adjust the end of the strip such that the mean central line of the cambered end portion would be substantially on the center line of the apparatus.

With the foregoing considerations in mind, it is an object of the invention to temporarily clamp the end portion of a strip to be welded in a movable clamp and then to move the clamp in such manner that it will bring the mean center line of the end of the strip onto the center line of the apparatus. When this is done with the adjacent end of a succeeding coil, the mean center lines of the ends to be joined become colinear.

It is another object of the invention to provide a number of sensing elements and to provide an operative connection between the sensing elements and means for moving the movable clamp such that the strip end will be oriented as above outlined.

It is another object of the invention to carry out the above described operation not only on the trailing edge of a first strip, but also on the leading edge of a second strip which is to be jointed thereto.

Thus it is yet another object of the invention to provide two clamping devices for each of the strip ends to be joined together. For each strip end, one of the two clamping devices is movable both in rotation about a vertical axis and translation in the plane of the strip. The other clamp of each pair if disposed adjacent the end of the strip for the purpose of clamping the strip end securely for shearing and joining.

These and other objects of the invention which will be pointed out in more detail hereinafter, or which will be apparent to one skilled in the art upon reading these specifications, are accomplished by that certain construction and arrangement of parts and by that method of which the following describes exemplary embodiments.

Figure 2:
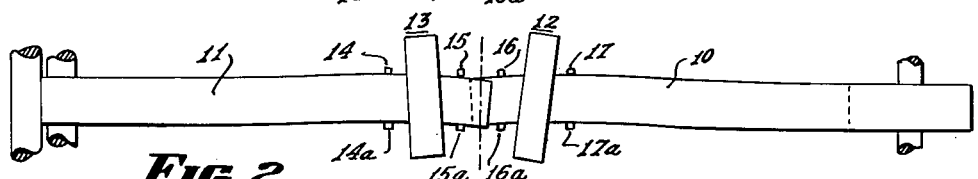
Figure 3:
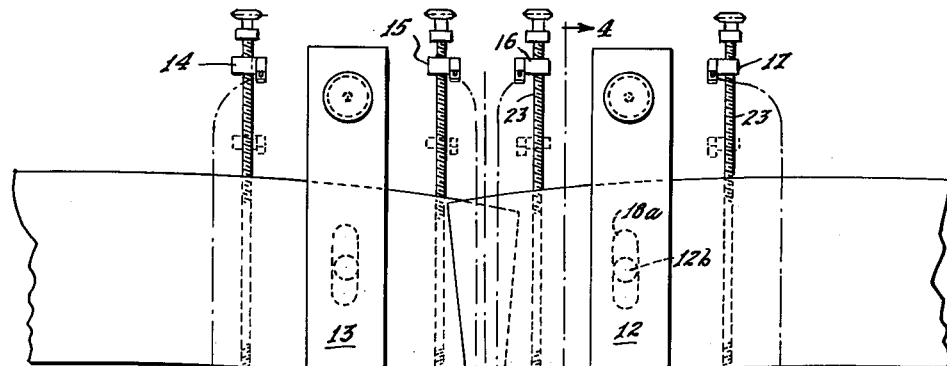
Figure 5:
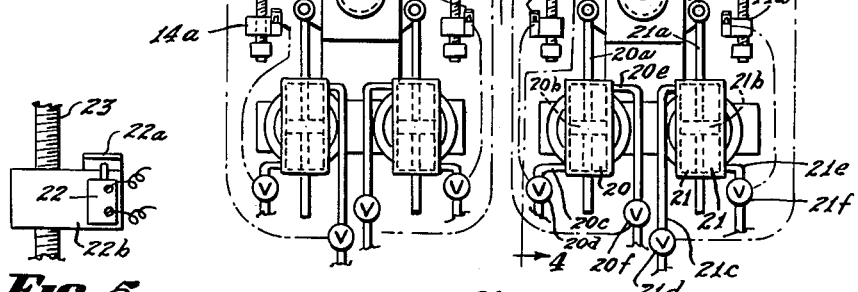
Figures 4, 6, 7:
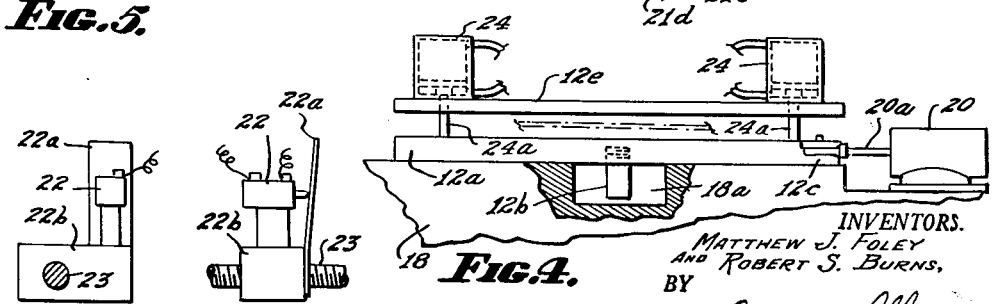
Figure 14:
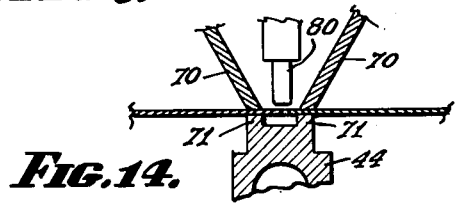

Reference is made to the drawings forming a part hereof and in which:
FIGURE 1 is a schematic plan view showing the movable clamps and the ends of two strips characterized by camber which are to be welded together.
FIGURE 2 is a view similar to FIGURE 1 showing the correction accomplished by the present invention.
FIGURE 3 is a somewhat diagrammatic plan view on an enlarged scale showing the relative positions of the sensing devices and the aligning clamps with the strip end clamps and the welding and shearing devices omitted.
FIGURE 4 is a fragmentary cross-sectional view taken on the line 4—4 of FIGURE 3.
FIGURE 5 is an enlarged plan view of one of the sensing devices.
FIGURE 6 is an end elevational view of the same.
FIGURE 7 is a side elevational view of the same.
FIGURES 8 to 13 inclusive are diagrammatic cross-sectional views showing the sequence of operations in the clamping, shearing and welding of the strip ends; and
FIGURE 14 is an enlarged cross-sectional view of the welding apparatus.

Briefly, in the practice of the invention, the trailing portion of the first strip is engaged at a point near but not at its end by means of an aligning clamp. This clamp is capable of rotation about a vertical axis and of translation in the plane of the strip. The clamp is moved by two fluid pistons operating in fluid cylinders and the flow of fluid in one direction or the other to the pistons is controlled by two pairs of sensing devices. The hydraulic system disclosed is exemplary only, but it will of course be clear that the clamp may be moved by means of electric motors connected by servo mechanisms to the sensing devices, or by any other suitable arrangement. The pairs of sensing devices are disposed in spaced relation longitudinally of the strip with one sensing device of each pair on each side of the strip.

The sensing devices are arranged for concurrent and equal movement toward each other and operative connections are provided from each of the sensing devices of the first pair to the two ends of a first fluid cylinder and from each of the devices of the other pair to the two ends of a second fluid cylinder.

As the sensing devices of the two pairs move toward each other, the two pistons will be actuated individually or concurrently in one direction or another whereby the clamp is rotated and translated until the mean center line of the end portion of the strip is substantially on the center line of the apparatus. As a result of this orientation, the radius of curvature of the end portion of the strip and which intersects the vertical axis of the clamp will be oriented normal to the center line of the apparatus. Thus, if clamps are disposed as close to the shear as practicable, the objects of the invention will be achieved.

When the strip end is thus oriented, a fixed clamp grips the strip end in its oriented position and the aligning clamp is released.

Thereafter, the same series of operations are carried out on the leading end of a second strip which is to be welded to the trailing end of the first so that the two ends to be welded are now clamped in a pair of spaced clamps. In the drawings, there is shown a box shear, and these clamps are arranged in conventional manner to move together from a shearing position to a welding position and to approach each other slightly in moving from the shearing position to the welding position. At the shearing position, the two ends are sheared parallel and the parallel ends are spaced apart. In moving to the welding station, the clamps approach each other such that the ends of the strips to be welded come into abutting relationship. If a single shear is used, the arrangement will be modified in well known manner. Supplementary clamping devices are associated both with the shearing device and the welding device, so that equal areas of the strip adjacent the shear and the weld are clamped under equal pressures so as to insure a perfect weld.

Referring now in more detail to the drawings, in FIGURE 1 a first strip is indicated at 10 and an exaggerated amount of camber has been shown. A second strip is indicated at 11, likewise showing an exaggerated amount of camber. According to the present practice, the ends of the strips would be sheared parallel in the position of FIGURE 1 and it will be seen that in a subsequent rolling operation the great tension on the strip would tend to tear the weld apart.

The aligning clamps are indicated generally at 12 and 13. The sensing devices for the aligning clamp 12 are indicated at 16, 16a, 17 and 17a, and the sensing devices for the clamp 13 are indicated at 14, 14a, 15 and 15a.

By reference to FIGURES 3 and 4, it will be seen that the frame member 18 upon which the aligning clamps are mounted is provided with a slot 18a disposed transversely of the pass line and that the lower clamping plate 12a carries a pin 12b which engages in the slot 18a. It will be clear that by virtue of the pin and slot construction the clamping plate 12a may have rotational movement about the pin 12b as an axis as well as translational movement within the limits of the dimensions of the slot 18a.

The lower clamping plate 12a is provided with a pair of oppositely extending ears 12c and 12d. Piston rods 20a and 21a are secured respectively to pistons 20b and 21b operating in the fluid cylinders 20 and 21. The cylinders 20 and 21 have fluid conduits leading into each end thereof. Thus, the cylinder 20 has an inlet 20c controlled by a valve 20d at one end and an inlet 20e controlled by a valve 20f for the other end. Similarly, the cylinder 21 has a conduit 21c controlled by a valve 21d for one end and a conduit 21e controlled by a valve 21f for the other end. As is diagrammatically indicated in FIGURE 3, the sensing device 16 is operatively connected to actuate the valve 20f and the sensing device 16a is operatively connected to operate the valve 20d. Similarly, the sensing device 17 is operatively connected to the valve 21d and the sensing device 17a to the valve 21f. The showing in FIGURE 3 being strictly diagrammatic, no provision has been shown for taking care of the fluid behind a piston when fluid is being supplied to the other side thereof. This will be accomplished by well known means not forming a part of the present invention, and not shown herein.

It will be understood that the same arrangement is provided for the aligning clamp 13 which therefore need not be described in further detail.

The sensing devices themselves may comprise conventional microswitches 22 (FIG. 7) actuated by feeler strips 22a and they are mounted upon nuts 22b. The nuts threadingly engage the lead screws 23. The lead screws 23 are allochirally threaded so that when a lead screw is rotated in a given direction, the two sensing devices mounted thereon will move either toward each other or away from each other at the same speed. Means are provided for rotating the lead screws 23 but such means may be conventional and are not shown. It will be understood that the sensing devices may constitute the levers to actuate the hydraulic valves if the strip material is heavy enough that this would not damage the strip edges.

Associated with each lower clamping plate is an upper clamping plate. Thus, as seen in FIGURE 4, associated with the lower clamping plate 12a is an upper clamping plate 12e to which are secured the fluid cylinders 24. Within each cylinder there is a piston secured to a piston rod 24a and the piston rods 24a are threaded into or otherwise secured to the lower clamping plate 12a.

Thus when fluid under pressure is admitted to the cylinders 24 below the piston, the clamping plate 12e is forced downwardly into clamping engagement with the plate 12a. In other words, the piston rods 24a are fixed while the cylinders 24, which are secured to the plate 12e, are movable.

In practice the clamping plate 12e is first caused to clamp the strip against the plate 12a. The screws 23 are then caused to rotate in a direction to cause the pairs of sensing members 16 and 16a and 17 and 17a, respectively, to approach each other. As soon as, for example, the sensing devices 16a touch the edge of the strip, the valve 20d is actuated to admit fluid behind the piston 20b so as to move the piston rod 20a upwardly as seen in FIGURE 3. If neither the sensing device 17 nor the sensing device 17a has encountered the strip, a slight clockwise rotation of the clamp 12 about its pin 12b will be produced. It will be understood, of course, that the cylinders 20 and 21 are mounted for rotation on rotary bearings for rotation about a vertical axis. This is necessary to prevent a binding action.

If, for example, the sensing device 17 next encounters the strip edge, the valve 21d will be actuated with the result that the rod 21a will be moved downwardly in FIGURE 3. Similarly, contact of the sensing device 17a with the strip edge actuates the valve 21f to move the rod 21a upwardly and contact of the device 16 actuates the valve 20f to move the rod 20a downwardly. It will be clear that these actions may take place singly and serially or concurrently, based upon the position of the strip with respect to the four sensing devices. It will also be understood that the final result will be to position the strip with the four sensing devices 16, 16a, 17, 17a all in contact with the strip edges whereby the radius of curvature of the cambered end of the strip will be parallel to the screws 23 and midway between them on the axis of the pin 12b. The clamp of course may occupy an angular position such as shown in FIGURE 2. Preferably the pairs of sensing devices should be spaced apart a distance corresponding approximately to the strip width and of course the entire device should be disposed as near to the shear line as possible.

Turning now to a description of the sequence of operations, and referring to FIGURES 8 to 13 inclusive, the trailing portion of the first strip is again indicated at 10 and the leading edge of the second strip is again indicated at 11. The aligning clamps are again indicated at 12 and 13 respectively. The strip end clamps are designated at 40 and 41. As mentioned above, these clamps may be of conventional type and arranged to travel together in moving from a welding station W to a shearing station S and back again. It will also be understood that the spacing between the clamps 40 and 41 at the welding station and at the shearing station will be different in that when the two ends of the strips have been sheared at the shearing station, they may be slightly spaced apart but as is well known when the clamps return to the welding station the clamp 41 moves an additional distance to bring the sheared edges into the required relationship for welding. An aligning die for the welding station is indicated at 42 and is provided with an aligning pin 43 and a backing shoe 44. An aligning member for the shearing station is indicated at 45 having the aligning pins 46 and 47 and the shear element 50a. In order to insure that the very edges of the strip will be clamped over equal areas for shearing and welding, the lower shear member is provided with the clamp elements 48a and 49a which are urged upwardly by springs 60. The upper shearing element 50 is provided with the clamp surfaces 48 and 49. Actual shearing takes place between the inner edges of the members 48 and 49 and the outer edges of the member 50a and the respective strip edges during the shearing operation are spring clamped on the one hand between the elements 48 and 48a and on the other hand between the elements 49 and 49a. Similarly, during the welding operation, as best seen in FIGURE 14, upper clamping elements 70 cooperate with lower clamping elements 71 over substantially the same area over the full width of the strip.

Figure 8:
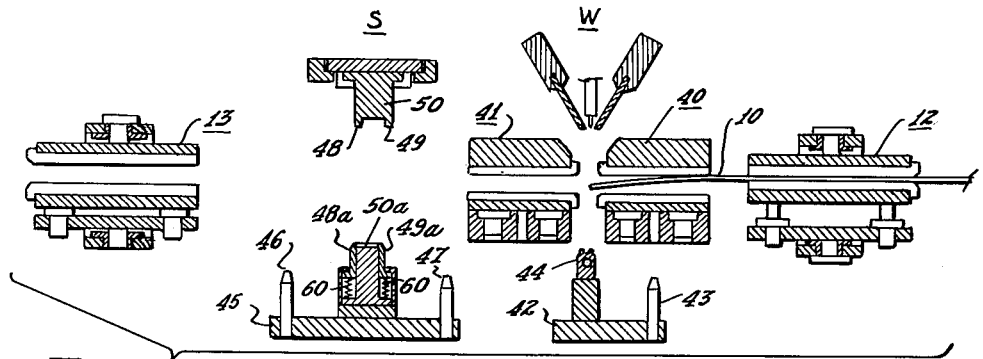
Figure 9:
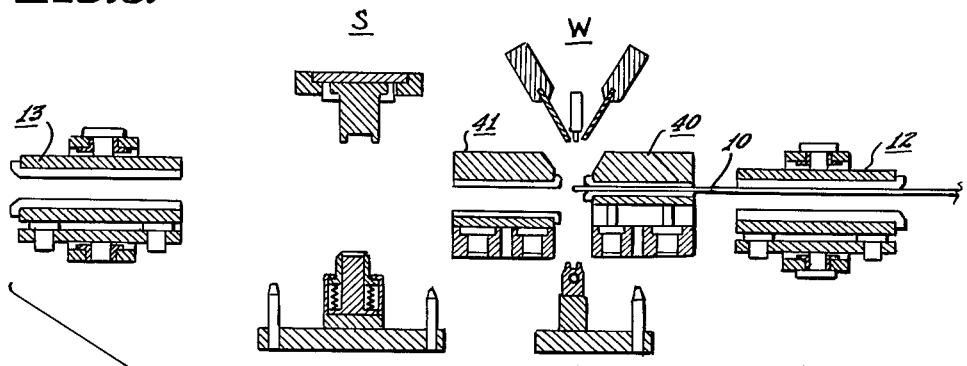
Figure 10:
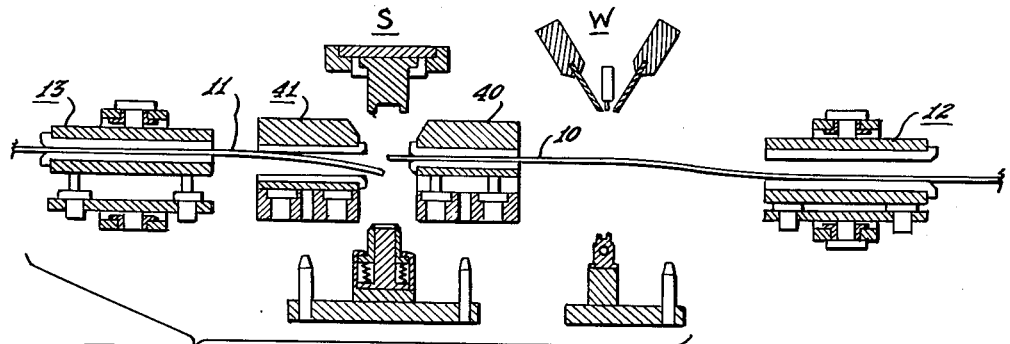

In FIGURE 8 the trailing portion of the strip 10 near but not at its end is shown as having been clamped in the aligning clamp 12. The aligning clamp 12 is then actuated as described above to properly align the strip end 10. As soon as this alignment is complete, the clamp 40 is actuated and the clamp 12 is released. This situation is illustrated in FIGURE 9. The strip end clamps 40 and 41 are then moved to the left to the shearing station, the clamp 40 carrying with it the strip end 10. The leading end of a second strip is then clamped in the aligning clamp 13 and oriented as above outlined. This situation is illustrated in FIGURE 10.

Figure 11:
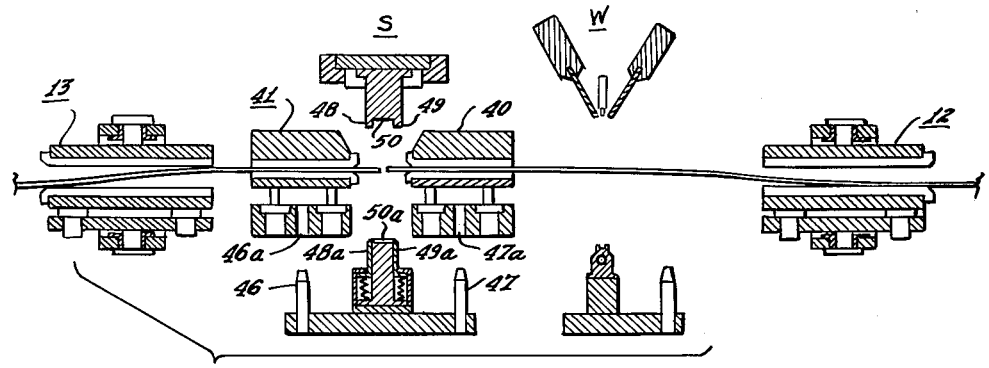
Figure 12:
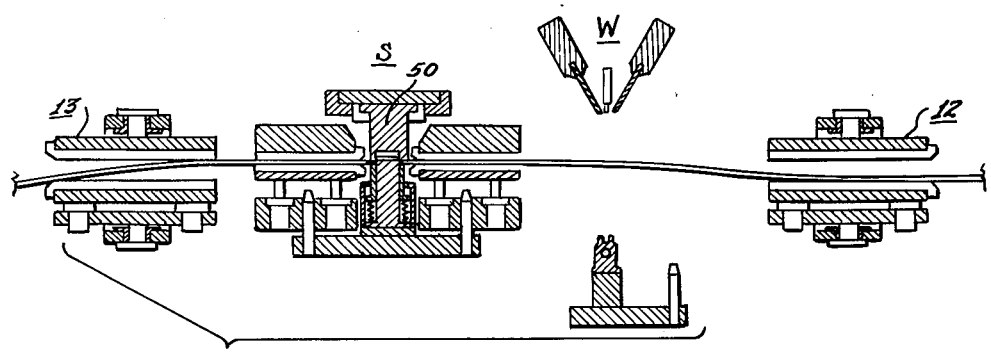
Figure 13:
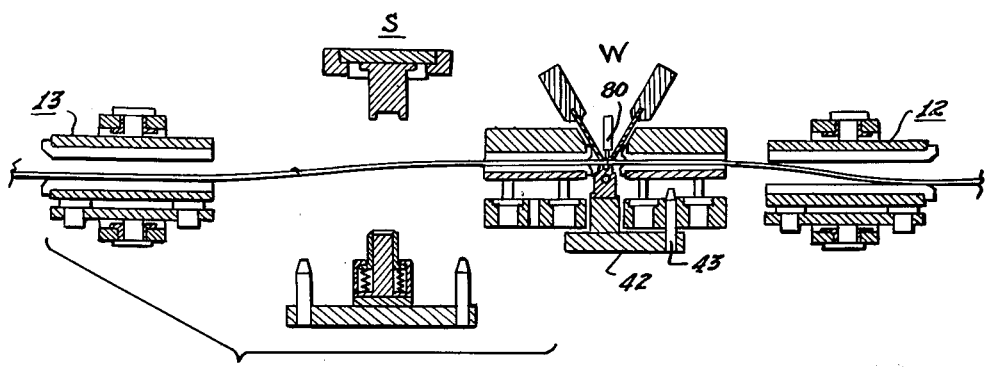

As soon as the strip end 11 has been aligned, the clamp 41 is actuated and the clamp 13 is released and the strip ends are then in position for shearing as seen in FIGURE 11. At this point the lower shear member is brought into position with its alignment insured by the entry of the pins 46 and 47 into the guide holes 46a, 47a in the lower members of the clamps 40 and 41 respectively, and the upper shear member then performs the shearing operation, as seen in FIGURE 12. At this point the ends to be welded have been sheared parallel.

The clamps 40 and 41 then return to the welding station and in so doing the clamp 41 approaches the clamp 40 to bring the sheared edges into abutting relation. The member 42 is then raised with its guide pin 43 entering the guide hole 47a and the welding head 80 is then lowered to perform the welding operation, with the clamping elements 70 and 71 cooperating as shown in FIGURE 14.

Only such detail of the welding and shearing apparatus as is necessary to an understanding of the invention has been shown and in other respects these devices may be conventional.

While the invention has been described particularly in connection with the welding end to end of metallic coils, it is of course also useful where the joining is accomplished by means other than welding, as for example, by stitching. Furthermore the aligning apparatus is useful in aligning any material, even paper or cloth, where the web edges cannot sustain an aligning pressure. In the case of materials such as paper, cloth, or metallic foil and the like, photoelectric sensing devices may be used, as is well known.

It will be understood that various modifications may be made without departing from the spirit of the invention and that the invention is not to be considered as being limited otherwise than as set forth in the claims which follow.

The invention having now been fully described, what is claimed as new and what it is desired to secure by Letters Patent is:

1. In the method of welding end to end for coiling and reworking of metallic strips which are characterized by camber, in a welding apparatus having a center line, the steps of temporarily clamping the leading portion of a strip at a point removed from but near the leading end thereof, adjusting the clamped portion in rotation and translation to move the mean center line of said clamped portion onto the center line of said apparatus and then clamping said leading end in aligned position for shearing and welding, temporarily clamping the trailing portion of a strip at a point removed from but near the trailing end a strip at a point removed from but near the trailing end thereof, adjusting the clamped portion in rotation and translation to move the mean center line of said clamp portion onto the center line of said apparatus and then clamping said trailing end in aligned position, shearing said leading and trailing ends perpendicularly to said center line and welding said sheared ends together.

2. In the method of welding end to end for coiling and reworking of metallic strips which are characterized by camber, in a welding apparatus having a center line, the steps of temporarily clamping the leading portion of a strip at a point removed from but near the leading end thereof, sensing the position of the strip edges at two substantially spaced positions axially of the strip adjacent said leading end, adjusting the clamped portion in rotation and translation to move the mean center line of the strip between said positions onto the center line of said apparatus and then clamping said leading end in aligned position for shearing and welding, temporarily clamping the trailing portion of a strip at a point removed from but near the trailing end thereof, sensing the position of the strip edges at two substantially spaced positions axially of the strip adjacent said trailing end, adjusting the clamped portion in rotation and translation to move the mean center line of the strip between said positions onto the center line of said apparatus and then clamping said trailing end in aligned position, shearing said leading and trailing ends perpendicularly to said center line and welding said sheared ends together.

References Cited in the file of this patent

UNITED STATES PATENTS

| | | |
|---|---|---|
| 802,967 | Brown | Oct. 31, 1905 |
| 1,995,546 | Meier | Mar. 25, 1935 |
| 2,078,365 | Biggert et al. | Apr. 27, 1937 |
| 2,181,502 | Biggert | Nov. 28, 1939 |
| 2,782,488 | Anderson | Feb. 26, 1957 |